UNITED STATES PATENT OFFICE.

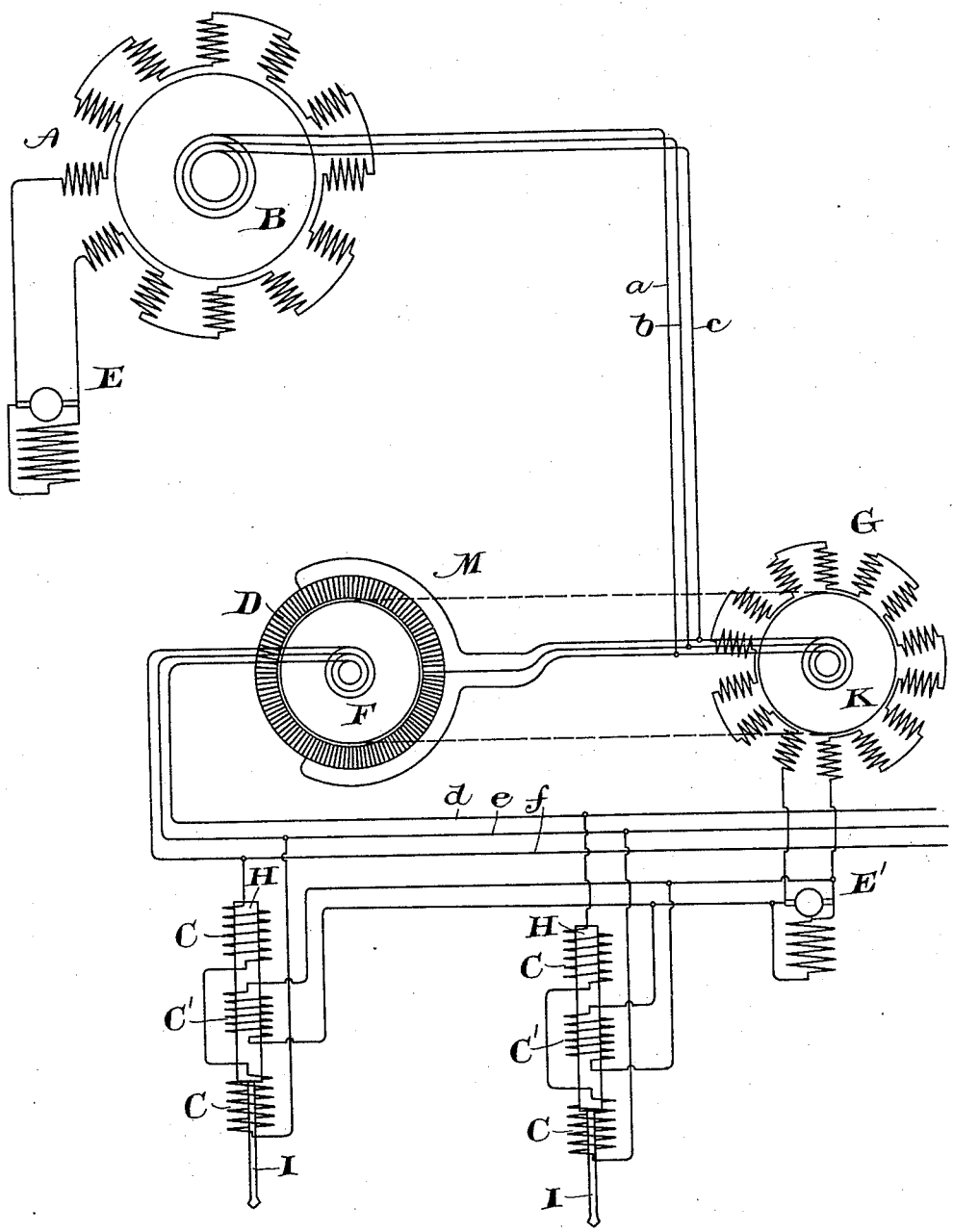

ERNST J. BERG, OF SCHENECTADY, NEW YORK, ASSIGNOR TO THE GENERAL ELECTRIC COMPANY, OF NEW YORK.

FREQUENCY-CHANGER.

SPECIFICATION forming part of Letters Patent No. 546,806, dated September 24, 1895.

Application filed June 21, 1895. Serial No. 553,528. (No model.)

*To all whom it may concern:*

Be it known that I, ERNST J. BERG, a subject of the King of Sweden and Norway, residing at Schenectady, in the county of Schenectady and State of New York, have invented certain new and useful Improvements in Transmission of Power for Mining Installations, of which the following is a specification.

My invention relates to transmissions for mining installations, and has for its object to utilize alternating currents in a way not before employed, so far as I am aware, affording great convenience and efficiency and rendering the use of such currents practicable where hitherto they could not be applied. Ordinarily for such work as that of mines the motors may be conveniently run by any of the now well-known systems, either of continuous or multiphase alternating currents; but where drills have also to be operated from the same circuit it has been necessary to use continuous current, because these pieces of apparatus require such extremely low frequencies of alternating current as to render it impracticable commercially on account of the large size and extremely slow speed of the generator and the large size of the transformers.

For the purposes of my invention I employ a standard three-phase or other multiphase alternating current machine of any frequency desired, of sixty cycles or one hundred and twenty-five cycles or any other commercial frequency. I may also install this apparatus at a distance from the point where the power is to be used and employ step-up and step-down transformers in ways well understood in the art. At or near the point where the drills are to be operated I install a three-phase induction-motor, to the inducing member of which I supply currents either from the generator or from the transformer, as occasion may require, and from the induced member of which I take current to the alternating-current coils of the drills, loading the motor as desired to get any proper amount of slip. The difference between the impressed frequencies and the frequencies of the alternating electromotive forces generated in the armature under load will be the frequency of the current taken from the induced member and supplied to the alternating-current coils upon the drills. Instead of wasting the energy necessary to produce this slip I may fix the armature of the motor to the same shaft as a suitable alternating-current generator, and this generator may be coupled into the main-current mains. In this case certain proportions would have to be observed, which will be more fully pointed out hereinafter. In other cases the generator may be a continuous-current machine run by the induction-motor and supplying current for whatever purposes may be needed, such as to the continuous-current coils of the drills, or for other motors, or for any other purpose.

The accompanying drawing shows an embodiment of my invention, wherein—

A is a generator of three-phase currents, the field-magnets of which are supplied from an exciter E.

B is an armature supplied with the usual collector-rings furnishing current to the mains *a b c*.

M is an induction-motor having a continuously-wound inducing member D and provided with an armature F, having collecting-rings, from which lead the mains *d e f*. The drills are shown connected between these mains in such a way as to balance the system, two only being shown; but any number may be employed. They are of a type not original with me, and consist of a plunger H, actuating a bit I. An intermediate coil C' is supplied with continuous currents, while the coils C C upon each side of the coil C' are supplied with alternating currents, preferably of extremely-low frequency. The vibrations of the drill will correspond in this case to the alternations of current. Connected to the induction-motor M, preferably by fitting upon the same shaft therewith, (although it may be rigidly connected thereto in any other way, as by a belt N, which I have indicated in dotted lines,) is another generator G, provided with a separate exciter E', which may be operated in any suitable way. The exciter furnishes not only the current for the field-magnets of the generator G, but also for the continuous-current coils C' C' of the drills. The generator has an armature K and collector-rings connected directly in the main-circuit leads $a\ b\ c$.

To utilize the generator in the way just pointed out it is necessary to preserve such proportion of poles between it and the main generator A that the currents supplied to the mains $a\ b\ c$ from the two machines will be of the same frequency, notwithstanding the fact that the generator G is run at a less speed than A, by reason of the drop or slip of the induced member F of the induction-motor. As is well known, the induction-motor does not run up to synchronism; but it is always a certain percentage behind. In the case illustrated the generator A is provided with twelve poles, and G is shown as having fourteen. The methods of proportioning generators are, however, well known in the art and will not be particularly described.

While I consider the arrangement just described an efficient one, yet my invention is not limited to this particularly, but consists, generally, in combining an alternating-current generator of high or moderate frequency and a drill or other apparatus requiring current of extremely-low frequency and interposing between the two an induction-motor, connecting the induced member of the induction-motor to the alternating-current coils of the drill, at the same time so loading the induction-motor as to get just the desired percentage of slip between the rotary field of the inducing member and the revolving induced member, thus maintaining between the mains leading to the coils alternating electromotive forces of such frequency as is best adapted to the apparatus to be operated.

The effect just named may, as is well understood, be produced by loading the motor, whether with actual mechanical load or with resistance, in ways well known in the art, and so far as the purposes of my invention are concerned it is immaterial whether the load be caused by a brake or by applying the power to useful work either in the way pointed out or in some other.

What I claim as new, and desire to secure by Letters Patent of the United States, is—

1. A generator of alternating current of normal or high frequency, lines leading therefrom, an induction motor having its inducing member supplied from the lines and its induced member supplying other lines, drills or other apparatus requiring currents of low frequency connected to the lines supplied from the induced member of the induction motor, a generator of alternating currents operated by the induction motor, and an exciter supplying the generator and the continuous current coils upon the drills.

2. A generator of alternating current of normal or high frequency, lines leading therefrom, an induction motor having its inducing member supplied from the lines and its induced member supplying other lines, drills or other apparatus requiring currents of low frequency connected to the lines supplied from the induced member of the induction motor, a generator of alternating currents operated by the induction motor, and an exciter supplying the generator and the continuous current coils upon the drills; the generator being connected to line, substantially as described.

In witness whereof I have hereunto set my hand this 19th day of June, 1895.

ERNST J. BERG.

Witnesses:
A. F. MACDONALD,
T. J. JOHNSTON.